US011671361B2

(12) United States Patent
Devaraj et al.

(10) Patent No.: US 11,671,361 B2
(45) Date of Patent: Jun. 6, 2023

(54) CENTRALIZED MANAGEMENT AND DISTRIBUTED ENFORCEMENT OF POLICIES FOR NETWORK SEGMENTATION

(71) Applicant: Arista Networks, Inc., Santa Clara, CA (US)

(72) Inventors: Naveen Kumar Devaraj, San Jose, CA (US); Rajshekhar Biradar, Bengaluru (IN)

(73) Assignee: Arista Networks, Inc., Santa Clara, CA (US)

( * ) Notice: Subject to any disclaimer, the term of this patent is extended or adjusted under 35 U.S.C. 154(b) by 113 days.

(21) Appl. No.: 16/871,581

(22) Filed: May 11, 2020

(65) Prior Publication Data

US 2021/0352013 A1 Nov. 11, 2021

(51) Int. Cl.
*H04L 45/74* (2022.01)
*H04L 45/00* (2022.01)
*H04L 9/40* (2022.01)
*H04L 45/02* (2022.01)
*H04L 45/64* (2022.01)

(52) U.S. Cl.
CPC .............. *H04L 45/74* (2013.01); *H04L 45/02* (2013.01); *H04L 45/04* (2013.01); *H04L 45/38* (2013.01); *H04L 45/64* (2013.01); *H04L 63/101* (2013.01)

(58) Field of Classification Search
CPC ......... H04L 45/74; H04L 45/02; H04L 45/04; H04L 45/38; H04L 45/64; H04L 63/101
See application file for complete search history.

(56) References Cited

U.S. PATENT DOCUMENTS

| 2014/0029617 | A1* | 1/2014 | Wang | H04L 12/54 370/392 |
| 2015/0333964 | A1* | 11/2015 | Wang | G06F 9/44 709/224 |
| 2017/0064047 | A1* | 3/2017 | Bosshart | H04L 69/22 |
| 2019/0182154 | A1* | 6/2019 | Kim | H04L 45/72 |

OTHER PUBLICATIONS

Marques et al., Cisco Systems, "Dissemination of Flow Specification Rules", Aug. 2009, 22 pages.
Jeffrey Haas., Juniper Networks, "Clarification of the Flowspec Redirect Extended Community", Oct. 2015, 7 pages.

* cited by examiner

*Primary Examiner* — Peter G Solinsky
(74) *Attorney, Agent, or Firm* — Fountainhead Law Group P.C.

(57) ABSTRACT

A central controller in a data network can maintain a set of access control list (ACL) rules that represent traffic and data policies of the data network. The controller can autonomously propagate the set of ACL rules to switches in the data network. Each switch that receives the set of ACL rules can selectively install rules from the set based on criteria such as whether or not a given rule in the set is close to the source and device class.

21 Claims, 8 Drawing Sheets

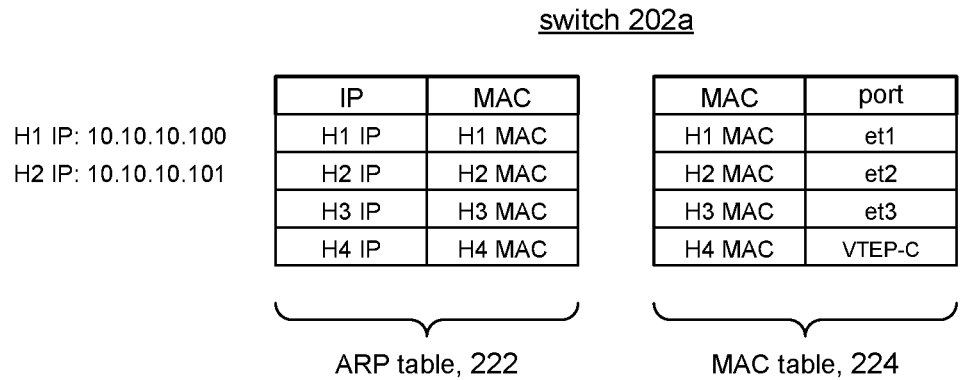

FIG. 2B

```
VLAN 10 GW: 10.10.10.1 / 24 --> GW1
VLAN 20 GW: 10.10.20.1 / 24 --> GW2
VLAN 30 GW: 10.10.30.1 / 24 --> GW3

(Overlay GW lives only on VTEPs that have hosts in a given VLAN)
VTEP-A: GW1
VTEP-B: GW2
VTEP-C: GW 1,2
VTEP-n: GW-3
``` routing table information

| prefix | route-type | next-hop | interface |
|---|---|---|---|
| 10.10.10.0/24 | directly connected | -- | VLAN10 |
| 10.10.20.0/24 | BGP | VTEP-B | VNI-1000 |
| 10.10.20.0/24 | BGP | VTEP-C | VNI-1000 |
| 10.10.30.0/24 | BGP | VTEP-n | VNI-1000 |
| VTEP-B IP/32 | BGP | spine | intltowards-spine |
| VTEP-C IP/32 | BGP | spine | intltowards-spine |
| VTEP-n IP/32 | BGP | spine | intltowards-spine |

FIG. 2C

CENTRALIZED MANAGEMENT AND DISTRIBUTED ENFORCEMENT OF POLICIES FOR NETWORK SEGMENTATION

BACKGROUND

A data network generally comprises a collection of computing and networking equipment designed for the purpose of managing and providing data to its users. A data center is generally a centralized data network where computing and networking equipment may be limited to a local area network (LAN), for example, within a building. A campus network can be viewed as a data network that spans a wider area than a data center and can comprise several LANs spread across several buildings. An enterprise network is a large data network that can include several LANs distributed across a wide geographic range and can be interconnect by a wide-area network (WAN).

Functions of the data network include collecting, storing, processing, and distributing data to the various users of the data network, including controlling access to the data. Access to the data network and to data stored in the data network is generally based on policies of the data network. Conventionally, system administrators manage the policies for the data network on a switch-by-switch basis. For example, a system administrator can log onto a switch in the data network and manually administer (e.g., install, update, delete) Access Control List (ACL) rules on that switch. The system administrator can then log onto the next switch in the data network to administer ACL rules on that switch, and so on for every switch in the data network. This can be labor intensive in large networks, and can be prone to errors. The challenge can be exacerbated in a segmented network environment that uses overlay technologies such as VxLAN with distributed overlay anycast gateways.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2A, 2B, 2C illustrate aspects of a portion of a data network in accordance with some embodiments.

DETAILED DESCRIPTION

Figure 1:
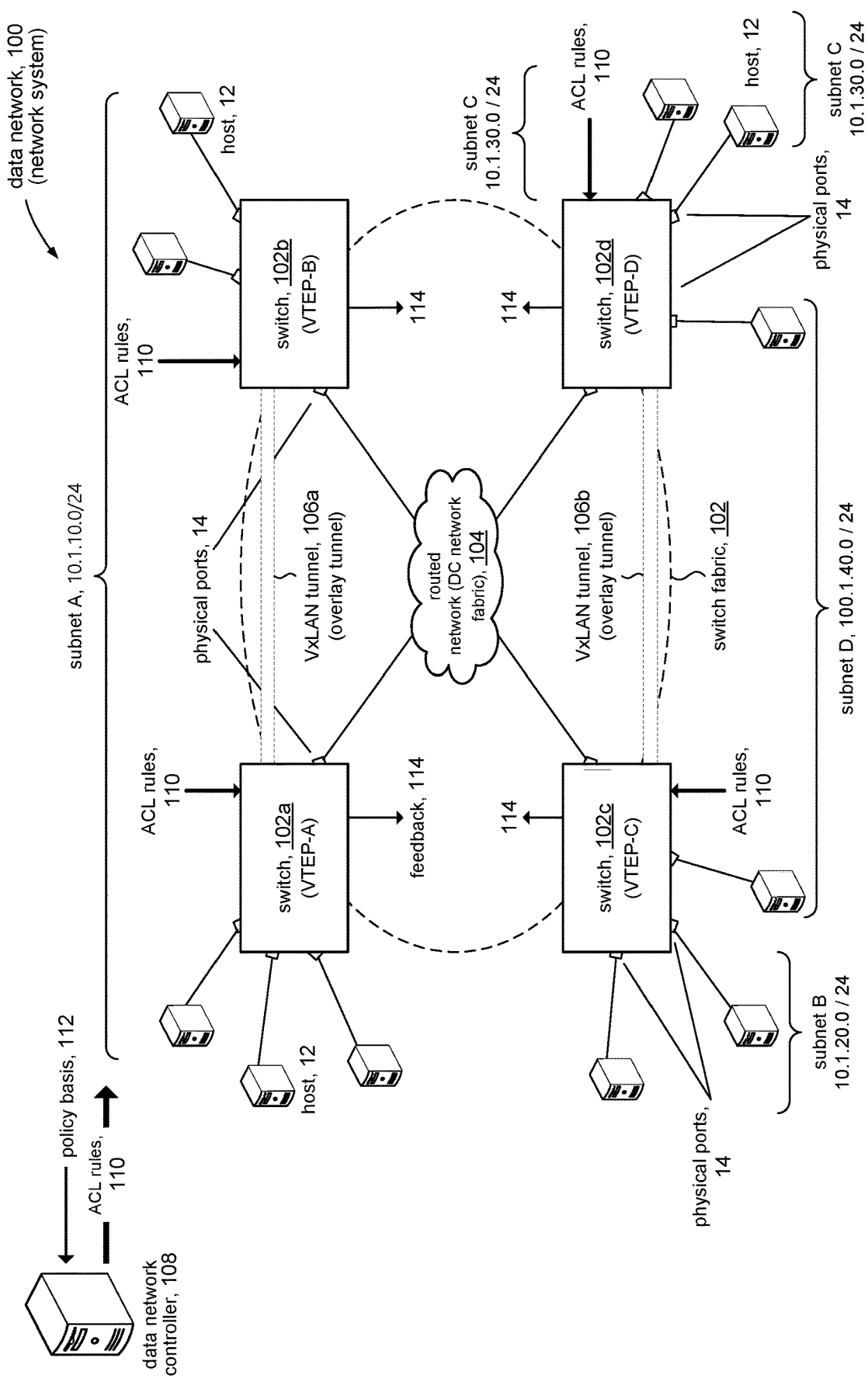
FIG. 1 is a high level representation of a data network in accordance with some embodiments.

Embodiments in accordance with the present disclosure are directed to centralizing the management and automated distribution of traffic policies to achieve network segmentation in a data network in order to reduce the effort required from a system administrator. Embodiments in accordance with the present disclosure provide for the administration and automated deployment of policies from a centralized facility (controller), such as Arista's CloudVision® network management system. ACL rules or other suitable representation of the traffic policies of an enterprise can be stored and maintained in the centralized facility; e.g., in a database system. An administrative user can define, update, and otherwise manage the ACL rules at the centralized facility. Embodiments in accordance with the present disclosure can autonomously distribute the managed ACL rules from the centralized facility to switches comprising the data network without further intervention by the administrative user. Each switch can receive the ACL rules and selectively install those rules that are close to the source of the data packets targeted by those rules.

A switch operating in accordance with the present disclosure can autonomously receive a set of ACL rules (e.g., from a data network controller) and install ACL rules into its forwarding hardware table(s); i.e., absent any input or other interaction by a user. This aspect of the present disclosure reduces the workload on a system administrator working in the data network, which can be significant when the data network comprises many tens to hundreds of switches.

A switch operating in accordance with the present disclosure can selectively install ACL rules from a received set of ACL rules. More specifically, the switch can identify and program only those ACL rules that will match on packets the switch can locally receive. By programming ACL rules close to the source host machines, packets can be filtered early on in the traffic thus improving fabric bandwidth usage in the network. By selectively installing ACL rules, utilization and lookup performance of the switch's forwarding hardware can be improved because ACL rules that target hosts connected to other switches will not be programmed in that switch.

During normal operations, host machines can move about in the data network. For example, a physical machine can be moved from one switch to another. In a campus or enterprise network, a user may move their laptop from one location to another; e.g., between classrooms, from a cubicle to a conference room, and so on. In the case of virtual machines (VMs), VMs can be moved to a different locations. For example, Vmware's virtual machines can be redeployed using Vmware's vMotion™ facility. In these cases, the host machine can be connected to different switches. The autonomous processing by switches in the data network operating in accordance with the present disclosure allows the switches to maintain proper placement of ACL rules close to their corresponding host machines, even as host machines move about in the data network. Likewise, if a host machine is disconnected from a switch or the host machine dies, ACL rules targeting that host machine will eventually be deleted thus avoiding wasting switch resources.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1 is a generalized representation of a network system in accordance with aspects of the present disclosure. In some embodiments, for example, the network system can be data network 100. A data network generally comprises a collection of computing and networking equipment designed for the purpose of managing and providing data to its users. In some embodiments, data network 100 can be a data center where computing and networking equipment can configured in a local area network (LAN). In some embodiments, data network 100 can be a campus network that spans a wider area than a LAN, and may comprise several LANs. In some embodiments, data network 100 can be an enterprise network comprising a large network computers and storage system defined by several LANs and wide-area networks (WANs).

Data network 100 can include host machines 12 (e.g., hosts, servers, end-user devices, etc.) that can be communicatively connected to respective switches 102a, 102b, 102c, 102d, which collectively represent switch fabric 102. Switches 102a-d can provide networking functionality such as routing, bridging, Layer 2 aggregation, and so on, and can support application services such as data, voice, video, and the like. Each switch 102a-d includes physical ports 14 to which host machines 12 can physically or otherwise directly connect, for example, by wired connections (e.g., Ethernet). Routed network 104 can be any suitable collection of equipment and cabling (e.g., copper wire, fiber optics, etc.) that serves as a network fabric to communicatively interconnect switches 102a-d.

Communications among host machines 12 can include overlay technology. Merely to illustrate, for example, switches 102a-102d can be configured for an overlay technique referred to as virtual extensible local area network (VxLAN). Switches 102a, 102b can be configured as respective VxLAN endpoint terminals VTEP-A, VTEP-B. VxLAN tunnel 106a can defined between VTEP-A and VTEP-B. Switches 102c, 102d can likewise be configured as respective VxLAN endpoint terminals VTEP-C, VTEP-D. VxLAN tunnel 106b can defined between VTEP-C and VTEP-D.

Data network 100 can be partitioned into two or more subnets. FIG. 1 illustrates, for example, various subnets A, B, C, and D. Some subnets (e.g., subnet A, D) can span across switches using overlay tunnels such as VxLAN. Some subnets can be defined entirely within a switch. FIG. 1, for example, shows that subnet B is defined entirely in switch 102c and subnet C is defined entirely in switch 102d. Switches can be defined with one or more subnets. Switches 102a, 102b, for example, support a single subnet, namely subnet A. Switch 102c, on the other hand supports subnet B and subnet D, and likewise switch 102d supports subnet C and subnet D.

Data network 100 can include a central controller or management computer. In some embodiments, data network 100 can include data network controller 108 to automate network operations, such as network device provisioning, compliance, change management, network monitoring, and so on. In accordance with the present disclosure, data network controller 108 can configure switches in the data network with access control list (ACL) rules 110, sometimes referred to as flow filters, flow rules, etc. ACL rules 110 control the flow of data packets (traffic) in the data network; for example, a data packet can be forwarded (permit) or not forwarded (deny).

In some embodiments, data network controller 108 can propagate ACL rules 110 to switches 102a-d, which then selectively install the ACL rules in accordance with the present disclosure. In other embodiments, data network controller 108 can selectively install ACL rules 110 in the switches in accordance with the present disclosure. These aspects of the present disclosure are discussed below.

Data network controller 108 can generate ACL rules 110 in accordance with policy basis 112. The policy basis represents traffic policies that govern user access to data network 100, access to data in the data network, access to host machines 12 in the data network, the traffic (east-west traffic) among host machines in the data network, traffic into and out of the data network, and so on. Policies that control access and traffic flow can be translated or otherwise represented in any suitable format for installation and execution on switch. Generally, traffic policies represent restrictions set forth by the entity that provides the data network, and in some embodiments these policies can be expressed as ACL rules. For discussion purposes, ACL rules 110 will serve as an example of a representation of traffic policies that can be installed among switches 102a-d comprising data network 100.

Policy basis 112 can be provided to data network controller 108 by a user, such as by a system administrator for example providing input to the data network controller via a suitable interface. In accordance with some embodiments of the present disclosure, data network controller 108 can receive feedback information 114 from switches comprising the data network where the feedback information can serve as the policy basis. In some embodiments, for example, switches 102a-d can collect metrics relating to ACL rules that were triggered in the switches. The collected metrics can be provided to data network controller 108 as feedback information 114. In other embodiments, data network controller 108 can learn about characteristics of host machines 12 connected to respective switches 102a-d. The learned information can be used as the policy basis for creating ACL rules 110. These aspects of the present disclosure are discussed in more detail below.

Figure 2A:
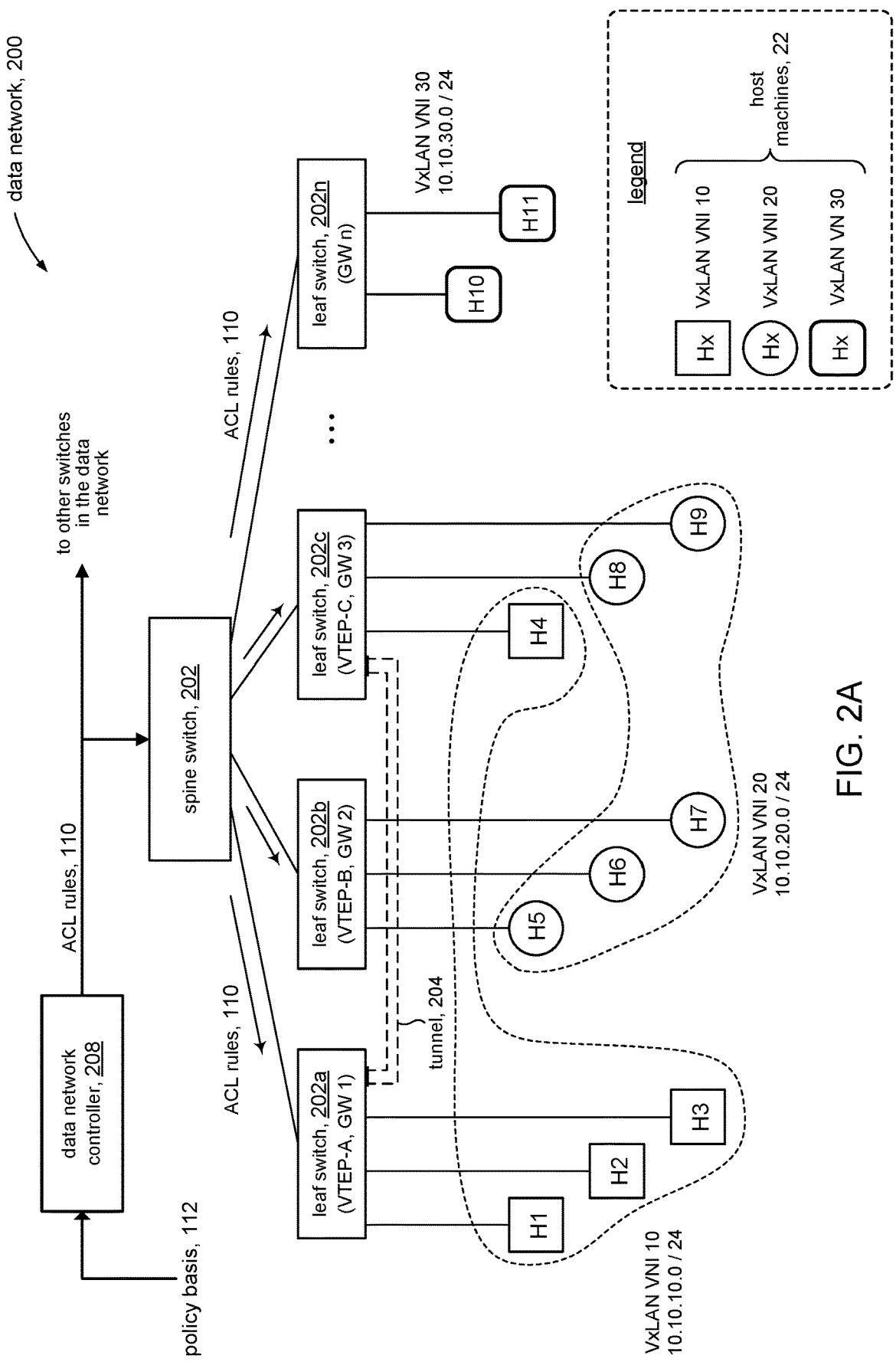

FIG. 2A is a simplified representation of a portion of a switch fabric comprising data network 200 to illustrate aspects of the present disclosure. The portion of the switch fabric shown in FIG. 2A is a topology referred to as a leaf-spine switch. The architecture comprises leaf switches 202a, 202b, 202c, 202d and one or more spine switches 202. The architecture can include one or more administrative devices (not shown) referred to as service leaf devices. In some embodiments, for example, data network controller 208 can communicate ACL rules 110 to service leaf devices (not shown), which in turn distribute them to spine switches 202 from which the ACL rules can be propagated to leaf switches 202a-n.

The leaf-spine configuration shown in FIG. 2A is configured with VxLANs, identified as VxLAN network identifiers (VNIs) 10, 20, and 30. Although only tunnel 204 is depicted for VxLAN VNI 10, it will be understood that corresponding tunnels are configured for VxLAN VNI 20 and VxLAN VNI 30. The figure includes a legend that explains the configuration of VxLANs. For example, host machines H1, H2, H3, H4 are on VxLAN VNI 10, which are connected to respective leaf switches 202a, 202c. Likewise, host machines H5, H6, H7, H8, and H9 are on VxLAN VNI 20 and are connected on respective leaf switches 202b, 202c, and so on.

Switches 202a, 202b, 202c can be configured as gateways, and in particular as anycast default gateways with the following gateway addresses:
VLAN 10 GW: 10.10.10.1/24
VLAN 20 GW: 10.10.20.1/24
The switches can further be configured as VTEPs to support the VxLANs.

Referring to FIG. 2B, each switch can include an ARP table and a MAC table. FIG. 2B, for example, shows some details for ARP table 222 and MAC table 224 in switch 202a. The Address Resolution Protocol (ARP) is used to learn a host's media access control (MAC) address based on the host's IP address. ARP table 222 maintains learned mappings between the IP address of a host machine and the host machine's MAC address. MAC table 224 maps a MAC address to a specific interface (port) on the switch. If a host machine is connected to an interface on the switch, the host machine's MAC address will be learned on the switch's interface and the MAC address in the MAC table will map to an identifier of that interface. A switch will learn ARP and MAC entries for hosts in a directly connected subnet. In the example shown in FIG. 2B, H1-H4 will be learned in VLAN 10 on switch 202a.

The host machine can be referred to as being "local" to the switch, and likewise the host machine's MAC address can be referred as being local to the switch. In FIG. 2A, for example, host machine H1 can be referred as being local to switch 202a. If the host machine is connected to a remote VTEP behind a tunnel, the host machine's MAC address will be learned behind the tunnel (e.g., VxLAN) and the MAC address will map to information (e.g., an identifier) that represents the VxLAN. In FIG. 2A, for example, host machine H4 is behind VxLAN VNI 20.

Referring to FIG. 2C, each switch can include a routing table. FIG. 2C, for example, represents information for leaf switch 202a that can be included in a routing table in leaf switch 202a. We see that route 10.10.10.0/24 is a directly connected route. The notion of a route being directly connected to the switch in the context of the present disclosure will be discussed below.

Figure 3:
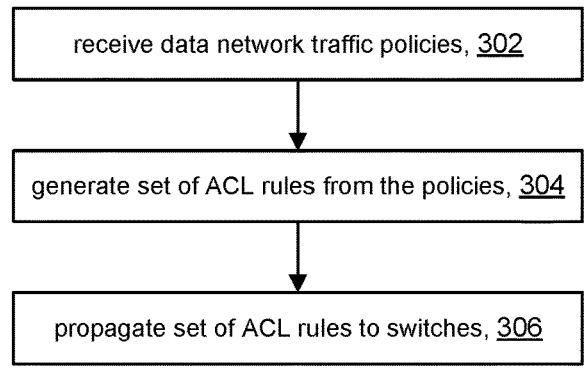
FIG. 3 is a high level representation of operations in a data network controller in accordance with some embodiments.

Referring to FIG. 3 and other figures, the discussion will now turn to a high level description of operations and processing in a data network controller (e.g., 108, FIG. 1) to provide network segmentation in a data network in accordance with the present disclosure. Network segmentation generally refers to dividing or otherwise partitioning a network into smaller segments, for example, by defining subnets in the network. Network segmentation can also include installing ACL rules in switches comprising the data network to control the flow traffic among host machines in the data network. In some embodiments, the data network controller can include computer executable program code, which when executed by one or more processors (e.g., 902, FIG. 9) comprising the data network controller can cause the data network controller to perform processing in accordance with FIG. 3.

At operation 302, the data network controller can receive traffic policies pertaining to access and traffic flow in the data network. In some embodiments, for example, the data network controller can include a suitable user interface that allows a system administrator to define, add, modify, delete and otherwise manage policies in the data network. Notably, in accordance with the present disclosure, the user is not required to tailor traffic and data policies on a per switch basis. For instance, the user can specify policies for host machines without regard to which switches the host machines are physically (directly) connected. In other words, policies can be specified irrespective of which host machines are connected to which switches in the data network. This aspect of the present disclosure can significantly reduce the user's efforts in setting up policies for the data network because they do not have to be concerned with whether or not a particular policy is applicable to a particular switch.

At operation 304, the data network controller can generate a set of ACL rules from the policies. As noted above, the policies received at operation 302 can be the basis (policy basis) for ACL rules that are provided to the switches. In some embodiments, for example, the data network controller can translate or otherwise convert the policies into a corresponding set of ACL rules. For instance, if switches support the border gateway protocol (BGP), the ACL rules can be expressed in a BGP flow specification (Flowspec) comprising a set of flow filters and communicated to the switches. It will be appreciated, however, that in general ACL rules can be represented in data formats other than as a BGP Flowspec. In accordance with some embodiments, the data network controller can generate one BGP Flowspec (one set of ACL rules) that represents the policies received at operation 302. More specifically, in some embodiments, the data network controller does not create different BGP Flowspec instances for different switches or different groups of switches.

At operation 306, the data network controller can propagate the ACL rules to the switches. In some embodiments, after the user has entered the policies, the user can trigger the data network controller to generate a set of ACL rules from the policies and propagate the generated set of ACL rules to the switches. In some embodiments, the controller can send ACL rules directly to the switches. In other embodiments, such as shown in FIG. 2A, the controller can send the ACL rules to an intermediary, such as spine switch 202, and the switches can then receive the ACL rules from the intermediary.

In accordance with the present disclosure, the ACL rules can be propagated to the switches and installed in the switches absent user intervention. In other words, after the user has input the policy basis, processing of ACL rules can proceed absent any user interaction. Using the BGP Flowspec example, for instance, in some embodiments the data network controller can advertise (propagate) the BGP Flowspec generated at operation 304 to each of the switches in the data network. In some embodiments, the data network controller can periodically advertise the same BGP Flowspec even though no changes were made. It will be seen that this allows the switches to update their respective installed ACL rules as host machines are added, deleted, or moved about in the data network.

The discussion will now turn to a description of processing, in accordance with the present disclosure, by switches in the data network that receive the set of ACL rules from the data network controller.

Figure 4:
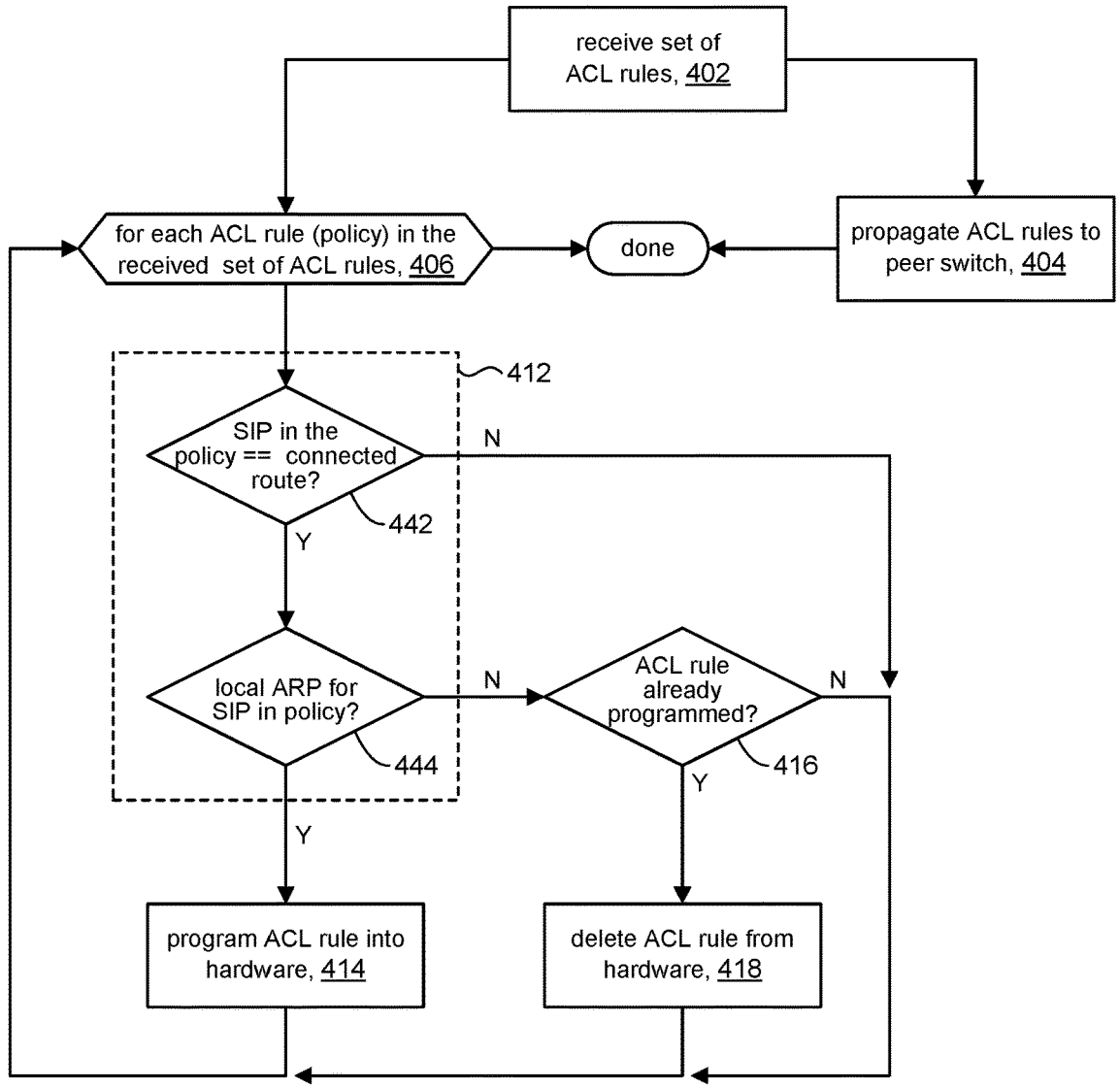
FIG. 4 is a high level representation of operations in a switch in accordance with some embodiments.

Referring to FIG. 4 and other figures, the discussion will now turn to a high level description of operations and processing in a switch (e.g., 102a, FIG. 1) in a data network to provide network segmentation in the data network in accordance with the present disclosure. In some embodiments, for example, the switch can include computer executable program code, which when executed by one or more processors (e.g., 808, FIG. 8) comprising the switch can cause the switch to perform processing in accordance with FIG. 4.

At operation 402, the switch can receive the set of ACL rules from the data network controller. As noted above, the set of ACL rules can be expressed in any suitable data format, such as for example, in a BGP Flowspec. Each ACL rule identifies packets to be filtered and generally contains information such as:

<action>, <SIP>, <DIP>, <protocol>, <src port>, <dst port> where action—specifies the action to be performed; e.g., permit, deny

SIP—is the source Internet protocol (IP) address of the packet

DIP—is the destination IP address of the packet protocol—identifies the type of packet; e.g., TCP, UDP, etc.

src port—identifies the application executing on the source host machine dst port—identifies the application executing on the destination host machine The switch can process each ACL at operation 406, described below.

At operation 404 the switch can propagate the received set of ACL rules (policies) to a peer switch. In some embodiments, for example BGP Flowspec, ACLs can propagate in-band, so there is no need to the controller to craft individual updates addressed to each switch. In a non-BGP Flowspec approach, typically there is an out-of-band connection from the switch to the controller, and the controller sends per-switch policy updates directly addressed to each switch.

Figure 8:
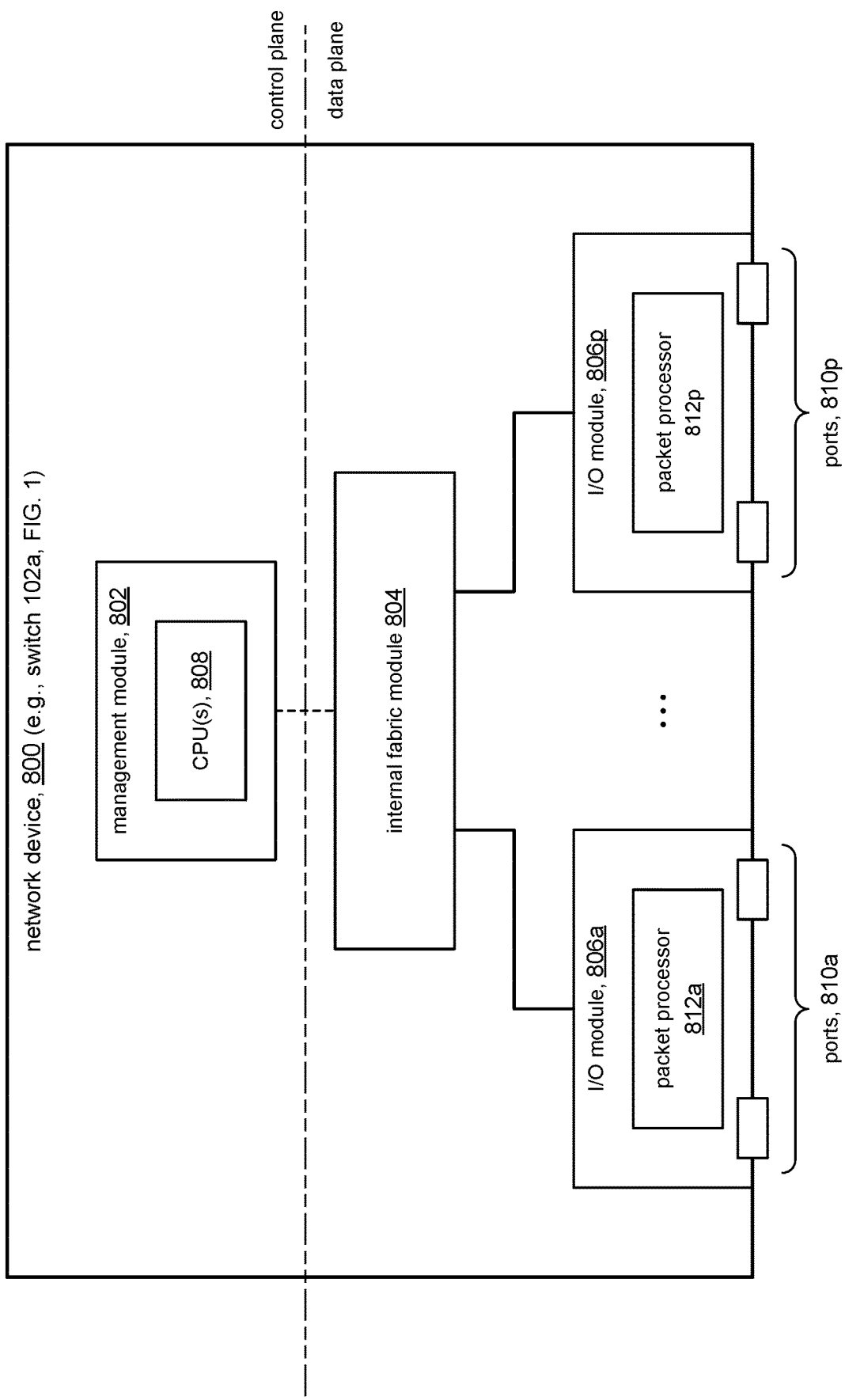
FIG. 8 illustrates details of a switch that can be adapted in accordance with some embodiments.

At operation 406, the switch can process each ACL rule in the received set of ACL rules in a for loop as follows:

At operation 412, the switch can determine whether or not to install the ACL rule in its forwarding engine hardware (e.g., 812a, FIG. 8). In some embodiments, this determination can include operation 442, where the switch can determine whether or not the source IP (SIP) address in the ACL rule identifies a directly connected route in the routing table. When a route is associated with an active port (local interface or tunnel interface) on the switch, that route can be referred to as a "directly connected route." Referring for a moment to FIG. 2A, for example, subnet 10.10.10.0/24 (VLAN 10) is a directly connected route on switches 202a and 202c. Likewise, subnet 10.10.20.0/24 (VLAN 20) is a directly connected route on switches 202b, 202c. In accordance with the present disclosure, an ACL rule identifies a directly connected route on the switch when the source IP address component in the ACL rule matches a subnet that is associated with an active interface on the switch. Consider the following ACL rule:

drop, 10.10.10.100, 10.10.30.100, TCP, any, port 80

Using FIG. 2A as an example, suppose we are at switch 202a. The above ACL rule identifies a route that is directly connected to switch 202a because the source address (10.10.10.100) matches subnet 10.10.10.0/24 on switch 202a (e.g., when using the longest prefix match convention). Now consider switch 202b, suppose we are at switch 202b; it can be seen the ACL rule does not identify a route that is directly connected to switch 202b. If we are at switch 202c, it can be seen that the ACL rule identifies both the 10.10.10.0/24 and 10.10.20.0/24 subnets.

In some embodiments, the switch's routing table (e.g., FIG. 2C) can be used to make the determination whether the ACL rule identifies a directly connected route on the switch. The routing table, for example, can indicate for a given IP address whether the IP address is directly connected or not. When the source IP address component in an ACL rule identifies a subnet that is directly connected to the switch, the ACL rule can be deemed to be a candidate for being installed on the switch, and processing can proceed to operation 444. Otherwise, processing can return to the top of the for loop to continue with the next ACL rule in the received set of ACL rules.

At operation 444, the switch can determine whether the source IP address component in the ACL rule is local to the switch. In some embodiments, for example, the ARP table and the MAC table (e.g., 222, 224, FIG. 2B) in the switch can be used to make this determination. The switch can do a lookup on the switch's ARP table using the source IP address in the ACL rule to obtain the corresponding MAC address. Referring then to the MAC table, if the MAC address maps to an interface ID (physical port) on the switch, then the ACL rule can be deemed to be local to the switch and processing in the switch can proceed to operation 414. In FIG. 2A, for example, host H1 is directly connected to switch 202a, and so an ACL rule that is associated with host H1 (i.e., targets packets from host H1) would be local to switch 202a. If the MAC address maps to a VTEP, then the ACL rule can be deemed to be "not local" to the switch and processing in the switch can proceed to operation 416. In FIG. 2A, for example, host H4 is directly connected to switch 202c, and so an ACL rule that is associated with host H4 would not be local to switch 202a.

It is noted that in some embodiments, operation 444 can be skipped if the switch is not configured for tunneling; for example, if the switch is not configured as a VTEP, the operation can be skipped. The operation can be skipped because all ARP entries would map to a local port, and so all ACL rules would be deemed local to the switch.

It is further noted that in some embodiments, operation 444 can be skipped if the source IP component in the ACL rule is a subnet IP address. An ACL rule can specify a source IP address that identifies a particular host machine; such an IP address can be referred to as a host IP address. The ACL rule example shown above sets forth a source IP that is a host IP address, and will match only packets from the host machine whose IP address is 10.10.10.100. An ACL rule can specify a source IP address that identifies a particular subnet; such an IP address can be referred to as a subnet IP address. The following ACL rule is an example that specifies a subnet IP address as the source IP:

drop, 10.10.10.0/24, 10.10.30.100, TCP, any, port 80

This ACL rule will match packets that come from any host machine on the 10.10.10.0/24 subnet.

At operation 414, the switch can install the ACL rule. In some embodiments, the switch can install the ACL rule by programming the ACL rule into the forwarding hardware table(s) of the switch; e.g., a static random access memory (SRAM), content-addressable memory (CAM), etc. As mentioned above, the ACL rule is deemed local to the switch. The ACL rule is "local" to the switch in the sense that the rule can match data packets from a host machine that is directly connected to the switch by virtue of the source IP address in the rule being associated with a route that is directly connected to the switch (operation 442) and that the MAC address associated with the source IP address maps to a physical port on the switch (operation 444). For this reason, the ACL rule can also be referred to as being close to the source, the source being the host machine that the rule is associated with. Processing of the ACL rule can be deemed complete, and processing in the switch can return to the top of the for loop to proceed with the next ACL rule in the received set of ACL rules.

At operation 416, the switch can inspect its hardware to determine whether the ACL rule is already programmed. In accordance with the present disclosure, when a host machine is no longer connected to the switch, previously programmed ACL rules that target the host machine are no longer local to the switch and can be deleted from the hardware. Recall this operation is reached from operation 444 because the source IP address component in the ACL rule was determined not to be local to the switch. The source IP address component in the ACL rule can be deemed not local to the switch either because (1) the ARP binding corresponding to the IP address of the host machine was never learned in the switch to begin with, or (2) the ARP binding was learned on the switch, but then aged out because the host machine became inactive or was moved. In the latter case, if the ACL rule is already programmed in the switch, then the already-programmed ACL rule can be deleted from the hardware at operation 418. Processing of the ACL rule can be deemed complete, and processing in the switch can return to the top of the for loop to proceed with the next ACL rule in the received set of ACL rules.

It can be appreciated from the processing shown in FIG. 4 that a switch operating in accordance with the present disclosure can autonomously receive a set of ACL rules (e.g., from a data network controller) and install ACL rules into its forwarding hardware table(s); i.e., absent any input or other interaction by a user. This aspect of the present disclosure reduces the workload on a system administrator working in the data network, which can be significant when the data network comprises many tens to hundreds of switches.

It can be further appreciated from the processing shown in FIG. 4 that a switch operating in accordance with the present disclosure can selectively install ACL rules from a received set of ACL rules in autonomous fashion without input from a user. More specifically, the switch can identify and program only those ACL rules that will match on packets the switch can locally receive. By programming ACL rules close to the source host machines, packets can be filtered early on in the traffic thus improving fabric bandwidth usage. By selectively installing ACL rules, utilization and lookup performance of the switch's forwarding hardware can be improved because ACL rules that target hosts connected to other switches will not be programmed locally.

The autonomous processing by the switches operating in accordance with the present disclosure allows the switches to maintain the placement of ACL rules close to their corresponding host machines, even as host machines move about in the data network. If a host machine is disconnected from a switch, ACL rules targeting that host machine will eventually be deleted thus avoiding wasting switch resources. When a host machine is connected to a switch, ACL rules targeting that host machine will eventually be installed in the switch. Referring to operation 306 in FIG. 3, for example, in some embodiments the data network controller can periodically propagate the set of ACL rules stored in the data network controller to switches in the data network, irrespective of whether any updates were made in the data network controller, so that the switches can periodically update their installed ACL rules.

Figure 5:
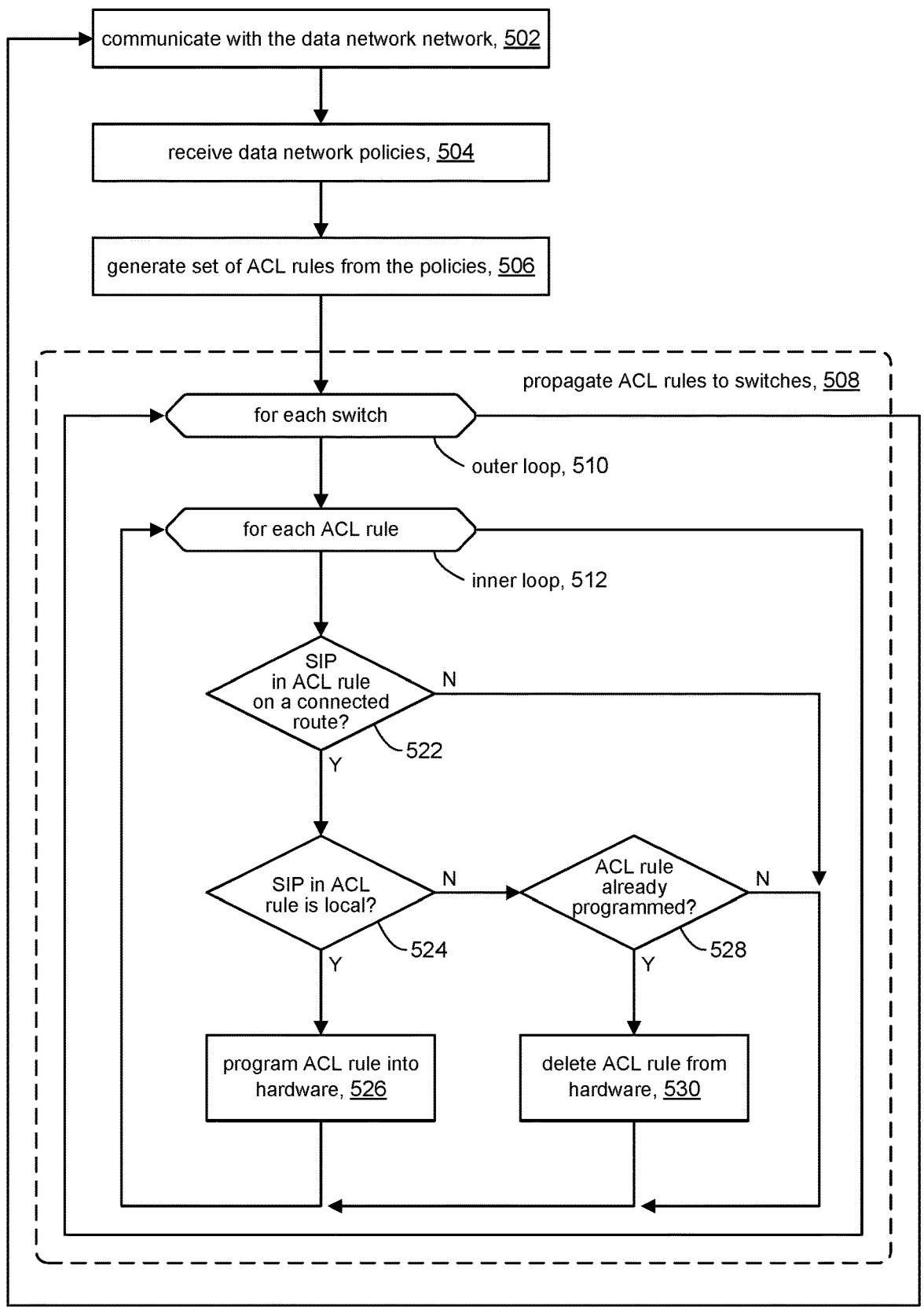
FIG. 5 is a high level representation of operations in a data network controller in accordance with other embodiments.

Referring to FIG. 5 and other figures, the discussion will now turn to additional processing in the data network controller (e.g., 108, FIG. 1, 208, FIG. 2A) in accordance with the present disclosure. In some embodiments, for example, the data network controller can communicate with the network fabric to discover endpoints (e.g., host machines) in the network, including endpoints behind a VTEP (e.g., FIG. 2A). The data network controller itself can install ACL rules according to what the data network controller learns. In some embodiments, the data network controller can include computer executable program code, which when executed by one or more processors (e.g., 902, FIG. 9) comprising the data network controller can cause the data network controller to perform processing in accordance with FIG. 5.

At operation 502, the data network controller can communicate with the network fabric to gain visibility of host machines in the data network, including identifying host machines behind VTEPs. In an Ethernet VPN (EVPN) environment, for example, the control plane is distributed across all switches in a leaf-spine topology. The data network controller appears as an EVPN-speaking node in the leaf-spine domain and thus has full visibility of the network. Referring for a moment to FIG. 2A, for example, hosts H1-H4 are on subnet 10.10.10.0/24. In an EVPN environment, data network controller 208 will know that host H4 is behind VTEP-C (202c) rather than being connected to switch 202a.

At operation 504, the data network controller can receive access and data network policies pertaining to access and traffic flow in the data network. This operation proceeds in the same manner as operation 302 in FIG. 3.

At operation 506, the data network controller can generate a set of ACL rules from the policies. This operation proceeds in the same manner as operation 304 in FIG. 3.

At operation 508, the data network controller can propagate the ACL rules to the switches. In some embodiments, for example, where the data network controller knows the switch and host machine configuration, the ACL rules can be installed by the data network controller itself. Each ACL rule in the set of ACL rules generated in operation 506 can be processed on a per switch basis in an outer loop 510. For each switch, each ACL rule can be processed in an inner loop 512 as follows:

At operation 522, the data network controller can determine whether or not the ACL rule identifies a route that is directly connected to the switch. This operation proceeds in the same manner as operation 442 in FIG. 4. When the source IP address component in an ACL rule identifies a subnet that is directly connected to the switch, the ACL rule can be deemed to be a candidate for being installed on the switch, and processing can proceed to operation 524. Otherwise, processing in the inner loop 512 can continue with the next ACL rule in the set of ACL rules.

At operation 524, the data network controller can determine whether the source IP address component in the ACL rule is local to the switch. This operation proceeds in the same manner as operation 444 in FIG. 4. If the ACL rule is deemed to be "local" to the switch, then processing in the data network controller can proceed to operation 526; otherwise, processing can proceed to operation 528. As noted above for operation 444, operation 524 can be skipped under certain circumstances.

At operation 526, the data network controller can install the ACL rule in the switch. In some embodiments, the data network controller can communicate with the switch to cause the ACL rule to be programmed into the switch's hardware. Processing of the ACL rule can be deemed complete, and processing in the inner loop 512 can continue with the next ACL rule in the set of ACL rules.

At operation 528, the data network controller can communicate with the switch to determine whether the ACL rule is already programmed in the switch, and if so the data network controller can communicate with the switch to cause the switch to delete the already-programmed ACL rule from the switch's hardware at operation 530. Processing of the ACL rule can be deemed complete, and processing in the inner loop 512 can continue with the next ACL rule in the set of ACL rules.

Figure 6:
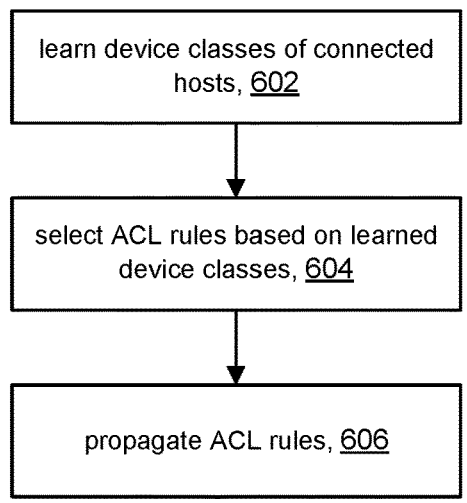
FIG. 6 is a high level representation of operations in a data network controller in accordance with still other embodiments.

Referring to FIG. 6 and other figures, the discussion will now turn to additional processing in the data network controller (e.g., 108, FIG. 1, 208, FIG. 2A) in accordance with the present disclosure. In some embodiments, for example, the data network controller can discover device class information for endpoints (e.g., host machines) in the network, including endpoints behind a VTEP (e.g., FIG. 2A). The data network controller itself can selectively program switches in the data network with selected ACL rules based on the discovered device class information. In some embodiments, the data network controller can include computer executable program code, which when executed by one or more processors (e.g., 902, FIG. 9) comprising the data network controller can cause the data network controller to perform processing in accordance with FIG. 6.

At operation 602, the data network controller can communicate with the network fabric to discover or otherwise learn about device class information for host machines in the data network such as phones, cameras, etc. As explained above, in an EVPN environment, the control plane is distributed across all switches in a leaf-spine topology. The data network controller appears as an EVPN-speaking node in the leaf-spine domain and thus can receive data from a VTEP about host machines behind the VTEP. Host machines might include a voice over IP (VOIP) capability, an IP camera, and so on. As such, host machines having certain types of devices or capabilities can be learned by the data network controller using protocols such as the Link Layer Discovery Protocol (LLDP) to advertise information about themselves (e.g., configuration information, device capabilities, etc.) to other devices on the network. The information can be signaled to the data network controller using EVPN or any other suitable messaging protocol.

At operation 604, the data network controller can select specific ACL rules based on the learned device classes. ACL rules can be selected to enhance security in connection with traffic involving the identified host machines based on the learned device classes of identified host machines. This aspect of the present disclosure can selectively program switches with specific ACL rules selected according to device class information on each of its connected hosts. This allows switches in the data network to be customized with policy rules to reflect capabilities of their connected host machines without having to program every switch in the data network. The process is automated because the data network controller can learn device class information, which obviates the need for a system administrator to manually determine device capability and manually program the switches. The automation also allows the ACL rules associated with the host machines, including the custom ACL rules specific to the device class(es) of the host machines to move with the host machines if host machines are redeployed elsewhere in the data network, for example, by physical relocation of host machines, virtual moves of virtual machines such as vMotion, and so on.

At operation 606, the data network controller can propagate the selected ACL rules to those switches to which the identified host machines are connected. In some embodiments, for example, the data network controller can communicate with the switches to cause the selected ACL rules to be programmed into the switches' hardware.

Figure 7:
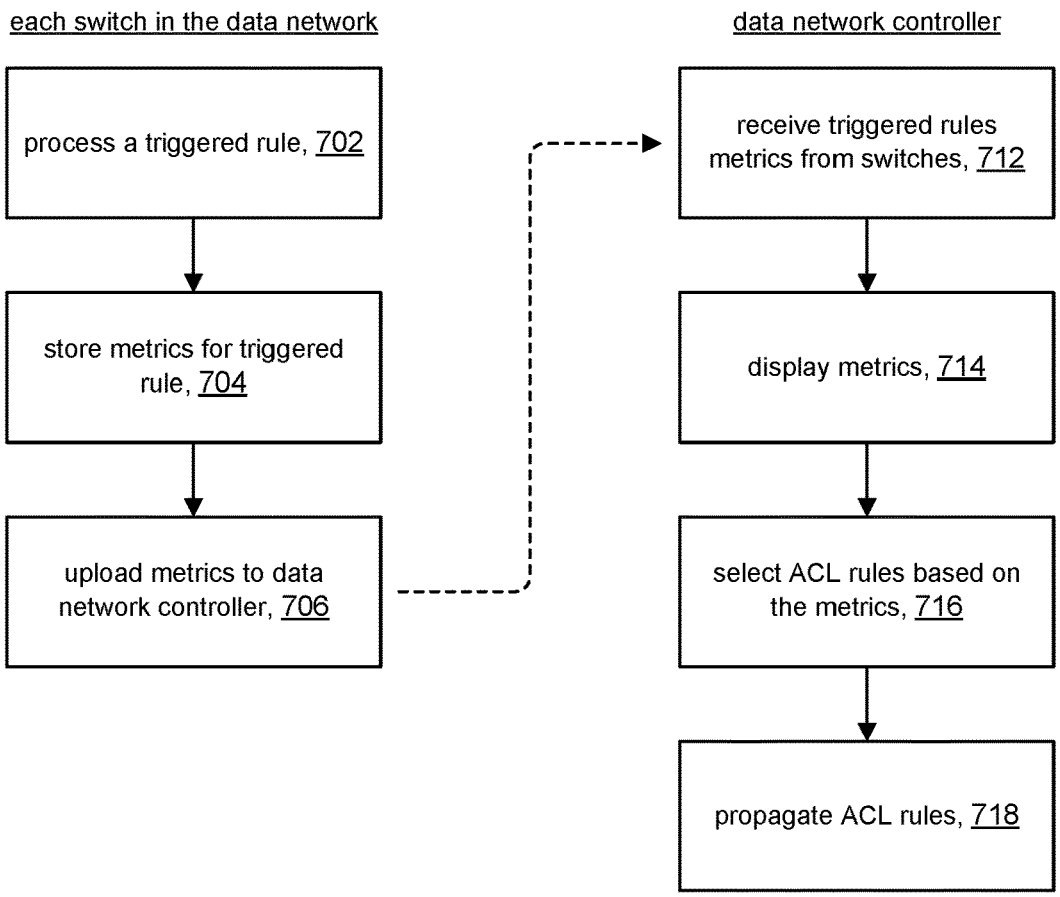
FIG. 7 is a high level representation of operations between a data network controller and a switch in accordance with some embodiments.

Referring to FIG. 7 and other figures, the discussion will now turn to additional processing in the data network controller (e.g., 108, FIG. 1, 208, FIG. 2A) and switches (e.g., 102a-d, 202a-n) in accordance with the present disclosure. In some embodiments, for example, the data network controller can collect metrics on ACL rules that are triggered in the switches in the data network. The data network controller can selectively program switches with additional ACL rules based on the collected metrics. In accordance with some embodiments, the switches can generate metrics relating to ACL rules that were triggered. These metrics can be provided to the data network controller. In some embodiments, the data network controller can include computer executable program code, which when executed by one or more processors (e.g., 902, FIG. 9) comprising the data network controller can cause the data network controller to perform processing in accordance with FIG. 7. In some embodiments, a switch can include computer executable program code, which when executed by one or more processors (e.g., 808, FIG. 8) comprising the switch can cause the switch to perform processing in accordance with FIG. 7.

At operation 702, the switch can process a trigger ACL rule when a packet matches the ACL rule.

At operation 704, the switch can aggregate and store metrics for the triggered rule. In some embodiments, for example, one metric can track the number of times a rule has been triggered. Another metric can track how often a destination IP address occurs. Other metrics can track time of day, size of packet, type of packet, and so on.

At operation 706, the switch can upload the aggregated metrics to the data network controller. In some embodiments, for example, the upload can be a periodic activity (e.g., on a scheduled basis). In other embodiments, the data network controller can poll the switch to pull the metrics from the switch.

At operation 712, the data network controller can receive aggregated metrics from each switch in the data network. In some embodiments, the metrics can be pushed from the switches to the data network controller. In other embodiments, the metrics can be pulled by the data network controller.

At operation 714, the data network controller can display the received metrics in a suitable manner in order to provide the system administrator visibility on traffic flow in the switches.

At operation 716, the data network controller can select ACL rules based on the received metrics. For example, if the metrics show a high level of traffic to an unintended destination from a particular user, additional ACL rules can be installed to log all traffic from that user to any destination, redirect all traffic from that user to a firewall for further inspection, and so on. Thus, host machines can be flagged based on the ACL rules that are triggered by their traffic patterns. This aspect of the present disclosure allows the data network controller to autonomously and dynamically respond to changing traffic conditions.

At operation 718, the data network controller can propagate the selected ACL rules to those switches to which flagged host machines are connected. In some embodiments, for example, the data network controller can communicate with the switches to cause the selected ACL rules to be programmed into the switches' hardware.

FIG. 8 depicts an example of a network device 800 in accordance with some embodiments of the present disclosure. In some embodiments, network device 800 can be a switch (e.g., 102*a*, FIG. 1). As shown, network device 800 includes a management module 802, an internal fabric module 804, and a number of I/O modules 806*a*-806*p*. Management module 802 includes the control plane (also referred to as control layer) of network device 800 and can include one or more management CPUs 808 for managing and controlling operation of network device 800 in accordance with the present disclosure. Each management CPU 808 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such a routing protocols, spanning tree, and the like.

Internal fabric module 804 and I/O modules 806*a*-806*p* collectively represent the data plane of network device 800 (also referred to as data layer, forwarding plane, etc.). Internal fabric module 804 is configured to interconnect the various other modules of network device 800. Each I/O module 806*a*-806*p* includes one or more input/output ports 810*a*-810*p* that are used by network device 800 to send and receive network packets. Each I/O module 806*a*-806*p* can also include a packet processor 812*a*-812*p*. Each packet processor 812*a*-812*p* can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Figure 9:
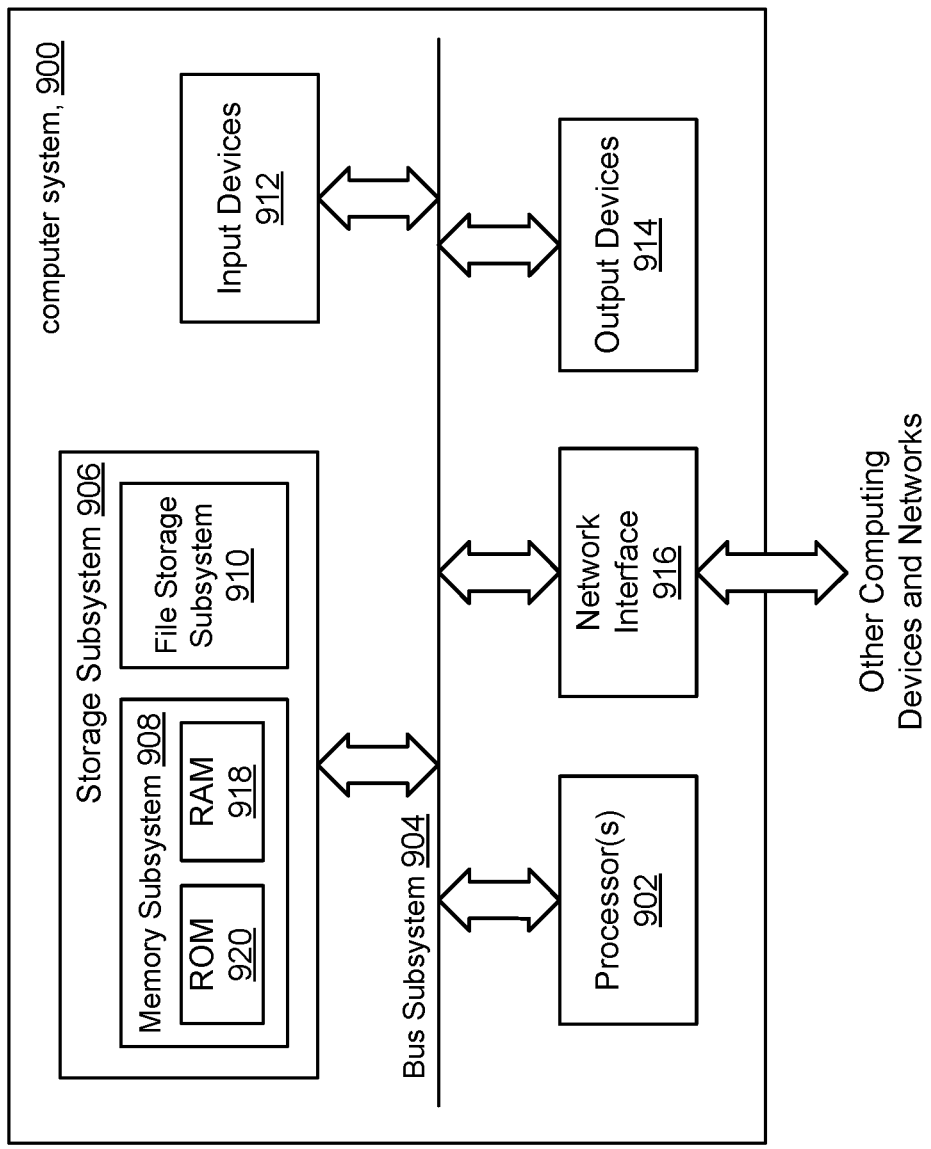
FIG. 9 illustrated details of a computer system that can be adapted in accordance with some embodiments.

FIG. 9 depicts a simplified block diagram of an example computer system 900 according to certain embodiments. Computer system 900 can be used to implement data network controller (e.g., 108, FIG. 1) described in the present disclosure. As shown in FIG. 9, computer system 900 can include one or more processors 902 that communicate with a number of peripheral devices via bus subsystem 904. These peripheral devices include storage subsystem 906 (comprising memory subsystem 908 and file storage subsystem 910), user interface input devices 912, user interface output devices 914, and network interface subsystem 916.

Bus subsystem 904 can provide a mechanism for communication between the various components and subsystems of computer system 900. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, and the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Memory subsystem 906 can include memory subsystem 908 and file/disk storage subsystem 910 represent non-transitory computer-readable storage media that can store program code and/or data, which when executed by processor 902, can cause processor 902 to perform operations in accordance with embodiments of the present disclosure.

Memory subsystem 908 includes a number of memories including main random access memory (RAM) 918 for storage of instructions and data during program execution and read-only memory (ROM) 920 in which fixed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Further Examples

In accordance with the present disclosure, a network device includes one or more computer processors, a memory, and a computer-readable storage medium comprising instructions for controlling the one or more computer processors to receive a plurality of ACL rules from a controller that is separate from the network device; selectively program the plurality of ACL rules in the memory of the network device, wherein an ACL rule in the plurality of ACL rules is programmed when the ACL rule targets data packets sent from a computer that is deemed to be local to the network device; and send at least some of the ACL rules in the plurality of ACL rules to a peer network device.

In some embodiments, the computer is deemed to be local to the network device when the computer is on a route that is directly connected to the network device.

In some embodiments, the computer-readable storage medium further comprises instructions for controlling the one or more computer processors to communicate with a spine switch, the spine switch having stored therein the plurality of ACL rules from the controller, wherein the network device receives the plurality of ACL rules from the controller via the spine switch.

In some embodiments, the computer-readable storage medium further comprises instructions for controlling the one or more computer processors to: determine whether a source address in the ACL rule identifies a directly connected route; determine whether the source address in the ACL rule is local to the network device; and program the ACL rule in the memory of the network device when the source address identifies a directly connected route and is local to the network device.

In some embodiments, the computer-readable storage medium further comprises instructions for controlling the one or more computer processors to delete the ACL rule from the memory of the network device when the ACL rule is already programmed in the memory of the network device and the computer targeted by the ACL rule is no longer connected to the network device.

In some embodiments, the computer-readable storage medium further comprises instructions for controlling the one or more computer processors to collect information relating to ACL rules programmed in the memory of the network device that have been triggered and providing the collected information to the controller, the network device receiving updated ACL rules from the controller in response to providing the collected information to the controller.

In some embodiments, at least some of the ACL rules in the plurality of ACL rules are based on device classes of computers connected to the network device.

In accordance with the present disclosure, a network device comprise one or more computer processors, a memory, and a computer-readable storage medium comprising instructions for controlling the one or more computer processors to: receive a plurality of ACL rules, the plurality of ACL rules stored in a data store of a controller that is separate from the network device; and process each ACL rule in the plurality of ACL rules, wherein an ACL rule is programmed in the memory of the network device when the ACL is associated with a route that is directly connected to the network device.

In some embodiments, the computer-readable storage medium further comprises instructions for controlling the one or more computer processors to send at least some of the ACL rules in the plurality of ACL rules to a peer network device.

In some embodiments, the computer-readable storage medium further comprises instructions for controlling the one or more computer processors to: determine whether a source address in the ACL rule identifies a directly connected route; determine whether the source address in the ACL rule is local to the network device; and program the ACL rule in the memory of the network device when the source address identifies a directly connected route and is local to the network device.

In some embodiments, the computer-readable storage medium further comprises instructions for controlling the one or more computer processors to communicate with a spine switch that contains the plurality of ACL rules from the controller, wherein the network device receives the plurality of ACL rules from the controller via the spine switch.

In some embodiments, the computer-readable storage medium further comprises instructions for controlling the one or more computer processors to delete the ACL rule from the memory of the network device when the ACL rule is already programmed in the memory of the network device and the ACL rule is no longer local to the network device.

In some embodiments, the computer-readable storage medium further comprises instructions for controlling the one or more computer processors to determine that the computer targeted by the ACL rule is no longer connected to the network device and, in response, deleting the ACL rule from the memory of the network device.

In accordance with the present disclosure, a method in a network switch comprises receiving a plurality of ACL rules from a controller that is separate from the network switch; for each ACL rule in the plurality of ACL rules, autonomously programming the ACL rule in a memory of the network switch when the ACL rule targets data packets sent from a computer that is deemed to be local to the network switch; and sending at least some of the ACL rules in the plurality of ACL rules to a peer network switch.

In some embodiments, the computer is deemed to be local to the network switch when the computer is on a route that is directly connected to the network switch.

In some embodiments, the computer is deemed to be local to the network switch when the computer is connected to a physical port of the network switch.

In some embodiments, the method further comprises determining whether a source address in the ACL rule identifies a directly connected route; determining whether the source address in the ACL rule is local to the network switch; and programming the ACL rule in the memory of the network switch when the source address identifies a directly connected route and is local to the network switch.

In some embodiments, the further comprises deleting the ACL rule from the memory of the network switch when the ACL rule is already programmed in the memory of the network switch and the ACL rule is no longer local to the network switch.

In some embodiments, the further comprises determining that the computer targeted by the ACL rule is no longer connected to the network switch and, in response, deleting the ACL rule from the memory of the network switch.

In some embodiments, the further comprises the network switch collecting information relating to ACL rules programmed in the memory of the network switch that have been triggered and providing the collected information to the controller, the network switch receiving updated ACL rules from the controller in response to providing the collected information to the controller.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A network device comprising:
   one or more computer processors;
   a memory that stores ACL (access control list) rules, each ACL rule comprising packet-identifying information to identify packets and one or more actions to be performed on identified packets; and
   a computer-readable storage medium comprising instructions for controlling the one or more computer processors to:
      receive a plurality of ACL rules from a controller that is separate from the network device;
      update a hardware forwarding table in the memory of the network device only ACL rules, from among the plurality of ACL rules, whose packet-identifying information targets data packets that originate from a computer that is deemed to be local to the network device; and
      send at least some of the ACL rules in the plurality of ACL rules to a peer network device.

2. The network device of claim 1, wherein the computer is deemed to be local to the network device when the computer is on a route that is directly connected to the network device.

3. The network device of claim 1, wherein the computer-readable storage medium further comprises instructions for controlling the one or more computer processors to communicate with a spine switch, the spine switch having stored therein the plurality of ACL rules from the controller, wherein the network device receives the plurality of ACL rules from the controller via the spine switch.

4. The network device of claim 1, wherein the computer-readable storage medium further comprises instructions for controlling the one or more computer processors to:
determine whether a source address in the at least one ACL rule identifies a directly connected route;
determine whether the source address in the at least one ACL rule is local to the network device; and
update the at least one ACL rule in the hardware forwarding table of the memory of the network device in response to a determination that the source address identifies a directly connected route and is local to the network device.

5. The network device of claim 1, wherein the computer-readable storage medium further comprises instructions for controlling the one or more computer processors to delete at least one ACL rule from the hardware forwarding table of the memory of the network device when the computer targeted by the ACL rule is no longer connected to the network device.

6. The network device of claim 1, wherein the computer-readable storage medium further comprises instructions for controlling the one or more computer processors to collect information relating to ACL rules stored in the hardware forwarding table of the memory of the network device that have been triggered and providing the collected information to the controller, the network device receiving updated ACL rules from the controller in response to providing the collected information to the controller.

7. The network device of claim 1, wherein at least some of the ACL rules in the plurality of ACL rules are based on device classes of computers connected to the network device.

8. The network device of claim 1, wherein the memory comprises content addressable memory (CAM).

9. A network device comprising:
one or more computer processors;
a memory; and
a computer-readable storage medium comprising instructions for controlling the one or more computer processors to:
receive a plurality of ACL rules from a controller that is separate from the network device, each ACL rule comprising packet-identifying information to identify packets and one or more actions to be performed on identified packets; and
process each ACL rule in the plurality of ACL rules, wherein an ACL rule is stored in a hardware forwarding table of the memory of the network device only when the packet-identifying information in the ACL rule is associated with a route that is directly connected to the network device.

10. The network device of claim 9, wherein the computer-readable storage medium further comprises instructions for controlling the one or more computer processors to send at least some of the ACL rules in the plurality of ACL rules to a peer network device.

11. The network device of claim 9, wherein the computer-readable storage medium further comprises instructions for controlling the one or more computer processors to:
determine whether a source address in the ACL rule identifies a directly connected route;
determine whether the source address in the ACL rule is local to the network device; and
store the ACL rule in the hardware forwarding table of the network device when the source address identifies a directly connected route and is local to the network device.

12. The network device of claim 9, wherein the computer-readable storage medium further comprises instructions for controlling the one or more computer processors to communicate with a spine switch that contains the plurality of ACL rules from the controller, wherein the network device receives the plurality of ACL rules from the controller via the spine switch.

13. The network device of claim 9, wherein the computer-readable storage medium further comprises instructions for controlling the one or more computer processors to delete the ACL rule from the hardware forwarding table of the network device when the ACL rule is no longer associated with a route that is directly connected to the network device.

14. The network device of claim 9, wherein the computer-readable storage medium further comprises instructions for controlling the one or more computer processors to determine that the computer targeted by the ACL rule is no longer connected to the network device and, in response, deleting the ACL rule from the hardware forwarding table of the network device.

15. A method in a network switch comprising:
receiving a plurality of ACL rules from a controller that is separate from the network switch, each ACL rule comprising packet-identifying information to identify packets and one or more actions to be performed on identified packets;
for each ACL rule in the plurality of ACL rules, autonomously storing the ACL rule in a hardware forwarding table in a memory of the network switch in response to a determination that the packet-identifying information in the ACL rule targets data packets sent from a computer that is deemed to be local to the network switch; and
sending at least some of the ACL rules in the plurality of ACL rules to a peer network switch.

16. The method of claim 15, wherein the computer is deemed to be local to the network switch when the computer is on a route that is directly connected to the network switch.

17. The method of claim 15, wherein the computer is deemed to be local to the network switch when the computer is connected to a physical port of the network switch.

18. The method of claim 15, further comprising:
determining whether a source address in the ACL rule identifies a directly connected route;
determining whether the source address in the ACL rule is local to the network switch; and
storing the ACL rule in the hardware forwarding table of the memory of the network switch when the source address identifies a directly connected route and is local to the network switch.

19. The method of claim 15, further comprising deleting the ACL rule from the hardware forwarding table of the memory of the network switch when the ACL rule no longer targets data packets sent from a computer that is deemed to be local to the network switch.

20. The method of claim 15, further comprising determining that the computer targeted by the ACL rule is no longer connected to the network switch and, in response, deleting the ACL rule from the hardware forwarding table of the memory of the network switch.

21. The method of claim 15, further comprising the network switch collecting information relating to ACL rules in the hardware forwarding table of the memory of the network switch that have been triggered and providing the collected information to the controller, the network switch receiving updated ACL rules from the controller in response to providing the collected information to the controller.

* * * * *